May 19, 1931. W. C. SAUNDERS 1,805,636
WIRE REELING ATTACHMENT
Filed July 13, 1929 2 Sheets-Sheet 1
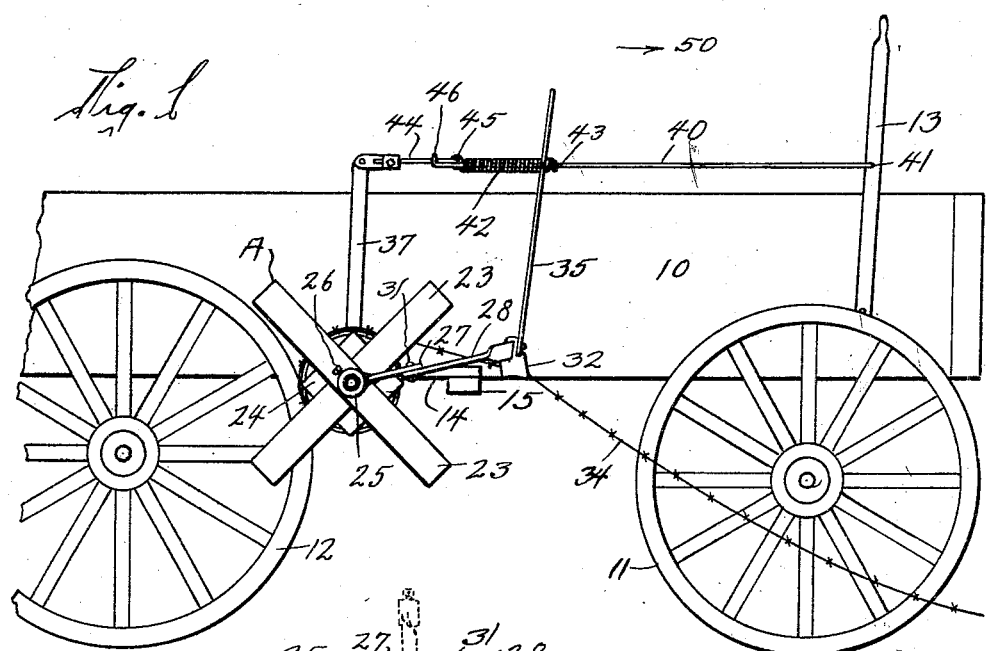
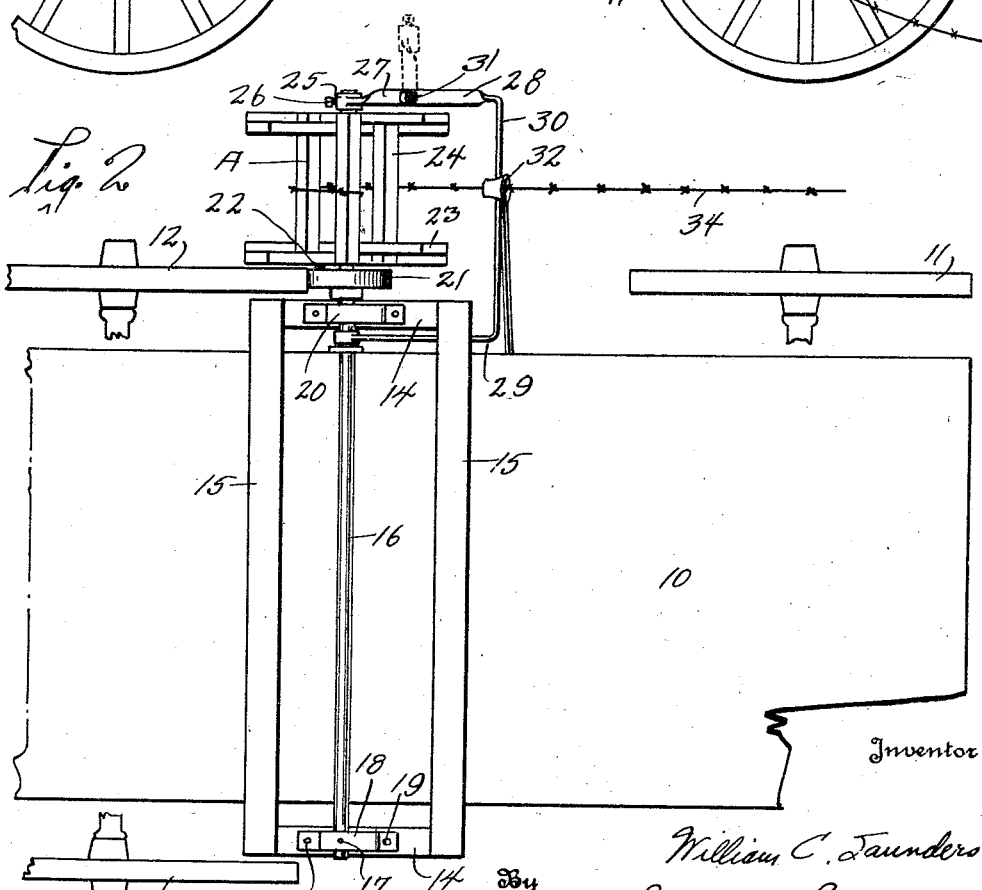
Inventor
William C. Saunders
By Lynn H. Latta
Attorney May 19, 1931. W. C. SAUNDERS 1,805,636
WIRE REELING ATTACHMENT
Filed July 13, 1929 2 Sheets-Sheet 2
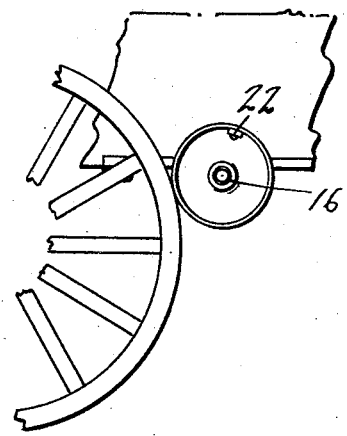
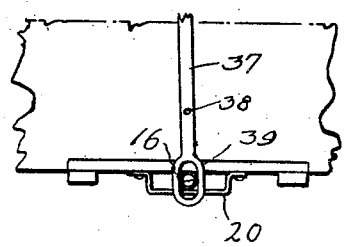
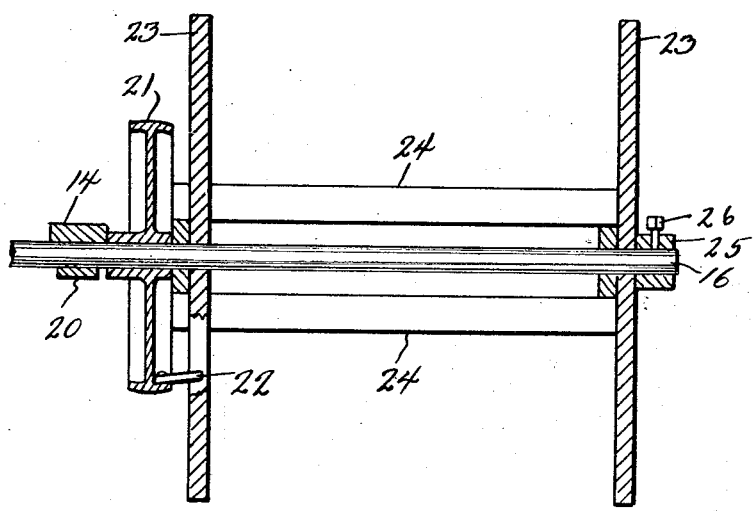
Inventor
William C. Saunders
By Lynn H. Latta
Attorney Patented May 19, 1931

1,805,636

UNITED STATES PATENT OFFICE

WILLIAM C. SAUNDERS, OF HINTON, IOWA

WIRE REELING ATTACHMENT

Application filed July 13, 1929. Serial No. 378,116.

My invention relates to a device for reeling wire such as barb wire and has for its object to provide an attachment for an ordinary farm wagon for performing this function, said attachment being such as to be driven from one of the wheels of the wagon.

An object of my invention is to provide a device of this kind which may be attached to a wagon with a minimum amount of alteration in the wagon itself.

A primary object of my invention is to provide a reeling attachment which is such as to allow removal of a filled reel from the reeling drive mechanism and the replacement of the filled reel by an empty reel.

Another object of the invention is to provide a simple arrangement for connecting the reel to the reel drive mechanism so as to obtain a driving engagement between the two with a minimum of difficulty. To this end, my invention contemplates the use of a reel shaft, a drive pulley adapted to be mounted for rotation upon said shaft, a reel also mounted for rotation upon the shaft and a clutch connection between the drive pulley and the reel.

Another object is to provide a simple and efficient control mechanism for engaging the drive pulley or disengaging the drive pulley to or from the rim of one of the wagon wheels, said control mechanism including means for allowing resilient pressure to be applied to the drive pulley in such a manner that the drive pulley may be allowed to slip against the wagon wheel while frictionally engaging the same.

Another object is to provide a guid device for guiding the wire upon the reel. My invention contemplates the use of a yoke shaped member, hinged upon the reel shaft and embracing the reel and drive pulley and a guide sleeve slidably mounted on the yoke shaped member for movement in a direction parallel to the reel shaft.

Another object is to provide a connection between the yoke and the reel shaft such as to allow ready removal of the reel from the yoke.

A further object is to provide an arrangement in which the yoke may be employed to lock the reel in place on the reel shaft.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of a wagon with my invention attached thereto.

Fig. 2 is an inverted plan view of the same.

Fig. 3 is a detail view of adjacent portions of the reel driving mechanism and the wagon wheel which drives the same, the reel being removed to better illustrate the driving mechanism.

Fig. 4 is a detail view showing the construction of the connection between the control mechanism and the reel shaft, the drive pulley being removed in order to illustrate this construction.

Fig. 5 is a sectional view taken longitudinally through the reel and reel drive assembly.

I have used the reference character 10 to indicate generally the box of the farm wagon having the front wheels 11 and the rear wheels 12.

The brake lever is shown at 13.

The step of the wagon is formed by a member 14, supported on the protruding ends of the spaced cross members 15, secured to the under side of the wagon box 10. This construction is a common construction in farm wagons and is clearly shown in the drawings.

I utilize this step construction for the purpose of supporting the attachment of my invention. This attachment comprises a reel shaft 16, which is pivoted at 17 between the step 14 on one side of the wagon and a yoke 18, which is secured at 19 to the step 14.

The reel shaft 16 extends the entire width of the wagon box on the under side thereof between the members 15, as shown in Fig. 2 and intermediate its length is supported between the step 14 on the opposite side of the wagon box from the pivot 17 and another yoke 20, which is identical in construction to the yoke 18. The yoke 20 is of such length as to provide an elongated slot in which the shaft 16 may slide.

The shaft 16 is extended considerably beyond the yoke 20 to form a trunnion for the drive pulley and the reel.

The drive pulley is loosely mounted on the shaft and so positioned as to engage one of the rear wheels 12, as shown in Fig. 2. The engagement of the hub of the pulley against the step 14 retains it in position.

The pulley is indicated by the reference character 21.

The pulley 21 is provided with a clutch finger 22, which may be secured to the rim of the pulley as shown in Fig. 3 or may be an integral part of the pulley.

The reel is indicated generally by the reference character A and comprises the crossed end members 23 and the connecting slats 24. Central openings are provided through the end members 23 to receive the shaft 16 which passes entirely through the reel.

The finger 22 projects sufficiently to extend across one edge of one of the cross members 23. When the reel is held against the pulley, the reel will serve to hold the pulley in place and also to lock itself in driving engagement with the pulley.

The reel is held in place by a collar 25, which forms part of the guide yoke. The collar 25 is provided with a set screw 26, by means of which the collar may be secured to the shaft. When the set screw is loosened, the collar 25 may be moved by sliding the entire yoke, of which it forms a part, longitudinally of the shaft until the collar is free of the shaft.

The yoke comprises the collar 25, an arm 27, formed integrally with the collar 25 and a U shaped member having the side arms 28 and 29, respectively, and the connecting bar 30. The arm 28 is short enough so that when the collar 25 has been removed from the shaft 16 and the arm 27 swung to the position shown in dotted lines in Fig. 2, the reel may be removed past the arm 28, the latter passing between the crossed end members 23.

The arm 27 is pivoted to the arm 28 as at 31. It will now be seen that a single set screw 26 serves to hold the rail in place and to lock the parts of the yoke in their position shown in Fig. 2, where the yoke is swingingly mounted as an integral unit upon the shaft 16.

The arm 29 extends across one of the cross members 15 of the wagon, thereby supporting the yoke in the position shown.

The guide sleeve is formed as a bell shaped member 32, having a hook 33, which slidably receives the bar 30 of the yoke. The barb wire 34 travels through the bell-shaped sleeve 32 to the reel as shown.

A lever 35 is pivoted at 36 to the sleeve 32 and extends over the edge of the wagon box 10 to within reach of the operator who, by moving the lever back and forth, may cause the sleeve 32 to slide upon the bar 30, thus guiding the wire 34 laterally to wind it evenly upon the reel.

It has already been noted that the shaft 16 is mounted for sliding movement within the yoke 20. This is to allow movement of the pulley 21 toward and from the wheel 12. I provide a control mechanism for holding the pulley 21 against the wheel 12, which is as follows: The lever 37 is pivoted at 38 to the side of the wagon box and at its lower end is provided with an elongated slot 39, which receives the shaft 16. As the lever is moved back and forth, the shaft will be carried with it to carry the pulley 21 against the wheel or away from it. In order to transmit movement to the lever, I provide a rod 40, which is pivoted as at 41 to the brake lever 13. The rod 40 is connected to the lever 37 through the medium of a spring 42, which is secured to the rod 40 at 43 and secured to a short link 44 as at 45.

The rod extends through the spring 42 as indicated in dotted lines in Fig. 1 and at its end is looped about the link 44 as at 46.

It will now be seen that the rods 40 and 44 are connected to the respective ends of the spring 42 and slidably mounted relative to each other so that the pull of the lever 13 may be transmitted to the lever 37 through the medium of the spring 42. At the same time, the amount which the spring 42 may stretch is limited by the engagement of the loop 46 against the end 45 of the spring 42 so that if desired or if necessary a much greater amount of pressure than the tensile strength of the spring 42 may be applied to the lever 37.

The advantages of the various features of my invention are as follows: In winding wire such as barb wire that has been taken down from a fence, it is desirable to pick the wire up from the position that it assumes after being deposited upon the ground adjacent the fence posts to which it was formerly attached. My invention will accomplish this in the most efficient manner by winding the wire as fast as it can be lifted from the ground. The wagon travels in the direction indicated by the arrow 50 and the wire is picked up and kept taut by the reeling device so that it will not drag behind the reeling mechanism. In this way, the wire may be picked up through the guiding device shown, which is most conveniently positioned extending forwardly from the reel. It would be difficult to extend the guide rearwardly because of the interference of the rear wheel 12. Furthermore in picking the wire up in this manner, there will be no friction of the wire dragging against the ground and the operation of the guiding device is rendered effective due to the fact that the wire extends in practically a straight line from the reel to a point where it touches the ground and the guide device engages it intermediate these two points with practically no pull of the wire against the guide sleeve.

The picking up of the wire in this manner is made possible by the spring tensioning device and by the use of a pulley 21, which is of sufficient size so that the pulley, if rotated against the wheel 12 without slippage, will wind the wire a trifle faster at the beginning of the winding movement than it is possible to pick up the wire from the ground. In other words, the pulley 21 will constantly have a slight slip against the rim of the wheel 12 and the tension of the spring 42 may be adjusted just sufficiently to keep the wire lifted in substantially the position shown.

As the size of the coil of wire increases with the winding of the wire upon the reel, the slippage of the pulley 21 will necessarily be greater, due to the increased diameter of winding surface. This will be compensated at all times by the resilient spring connection of the control mechanism.

Another very important feature of my invention is the removability of the reel. It will be readily understood that in order to be practical, a device of this character must be such as to allow large amounts of wire to be wound without considerable adjustment of the mechanism. For this purpose, it may be necessary to employ several reels. When one reel is full, it will be necessary to remove the reel and replace it with another. I have embodied in my invention a removable reel and mechanism for holding the reel in place and in connection with the driving means for easy removal of the reel. All that is necessary is to loosen the set screw 26 to swing the arm 27 to the dotted line position shown and to pull the reel from the shaft 16. A new reel may then be placed on the shaft and the collar 25 replaced on the shaft 16 and the set screw tightened. The new reel is then ready for work.

The guide mechanism is important because a greater amount of wire may be wound upon the reel where the wire is carefully spread back and forth from end to end of the reel during the winding process than where it is wound on the reel without attention to the distribution of the turns.

I consider the construction embodying the use of the steps 14 for supporting the reel shaft to be a very important feature of my invention for the reason that the mechanism for mounting the reel is thus disposed underneath the wagon where it will not interfere with the use of the wagon for other purposes. The steps also form a very simple and effective support structure requiring only the attachment of the yokes 18 and 20 for the supporting of the entire attachment on the wagon.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a wire reeling attachment for a farm wagon having a wagon box, a step supported by the box, a reel shaft pivoted to the step and extending transversely under the box, a reel carried by the other end of the shaft, a pulley for driving the reel, adapted to engage the rim of a wheel of the wagon, and a lever engaging the shaft and pivoted to the side of the wagon box to urge the pulley into engagement with the wheel.

2. In a wire reeling attachment for a farm wagon having a wagon box, a step supported by the box, a reel shaft pivoted to the step and extending transversely under the box, a reel carried by the other end of the shaft, a pulley for driving the reel, adapted to engage the rim of a wheel of the wagon, and means to urge the pulley into engagement with the wheel.

3. In a wire reeling attachment for a farm wagon having a box, a reel shaft supported by the box pivoted thereto at one end, and extending transversely thereunder, a reel carried by the other end of the shaft, a pulley for driving the reel, adapted to engage the rim of a wheel of the wagon, and means to urge the pulley into engagement with the wheel.

4. In a wire reeling attachment for a farm wagon, a reel shaft non-rotatably mounted on the wagon box, a pulley mounted loosely on the shaft in a position to engage the rim of a wheel of the wagon, a reel loosely mounted on the shaft, a separable driving connection between the pulley and reel, wire feeding apparatus comprising a guide sleeve, and a yoke embracing the reel, upon which said sleeve is mounted, said yoke being provided with loops receiving the shaft, one of said loops being secured to the shaft to hold the yoke and reel in place thereon.

5. In a wire reeling attachment for a farm wagon, a reel shaft non-rotatably mounted on the wagon box, a pulley mounted loosely on the shaft in a position to engage the rim of a wheel of the wagon, a reel loosely mounted on the shaft, a separable driving connection between the pulley and reel, wire feeding apparatus comprising a guide sleeve, and a yoke embracing the reel, upon which said sleeve is mounted, said yoke being provided with loops receiving the shaft, one of said loops being secured to the shaft to hold the yoke and reel in place thereon, and being embodied in a swinging arm, pivoted to the yoke, and adapted to swing to a position out of the way of a portion of the reel.

6. In a wire reeling attachment for a farm wagon having a box, a reel shaft supported by the box pivoted thereto at one end, and extending transversely thereunder, a reel carried by the other end of the shaft, a pulley for driving the reel, adapted to engage the rim of a wheel of the wagon, means to urge the pulley into engagement with the wheel, an operating lever, and a link connecting said levers, including a tension spring.

7. In a wire reeling attachment for a farm wagon having a box, a reel shaft supported by the box pivoted thereto at one end, and extending transversely thereunder, a reel carried by the other end of the shaft, a pulley for driving the reel, adapted to engage the rim of a wheel of the wagon, means to urge the pulley into engagement with the wheel, a pair of rods, a spring connected at one end to the end of one rod, and at its other end to an intermediate portion of the other rod, said other rod extending through the spring and being looped about the first rod beyond its connection with the spring.

Signed this 13 day of June, 1929, in the county of Woodbury and State of Iowa.

WILLIAM C. SAUNDERS.